United States Patent Office 3,373,769
Patented Mar. 19, 1968

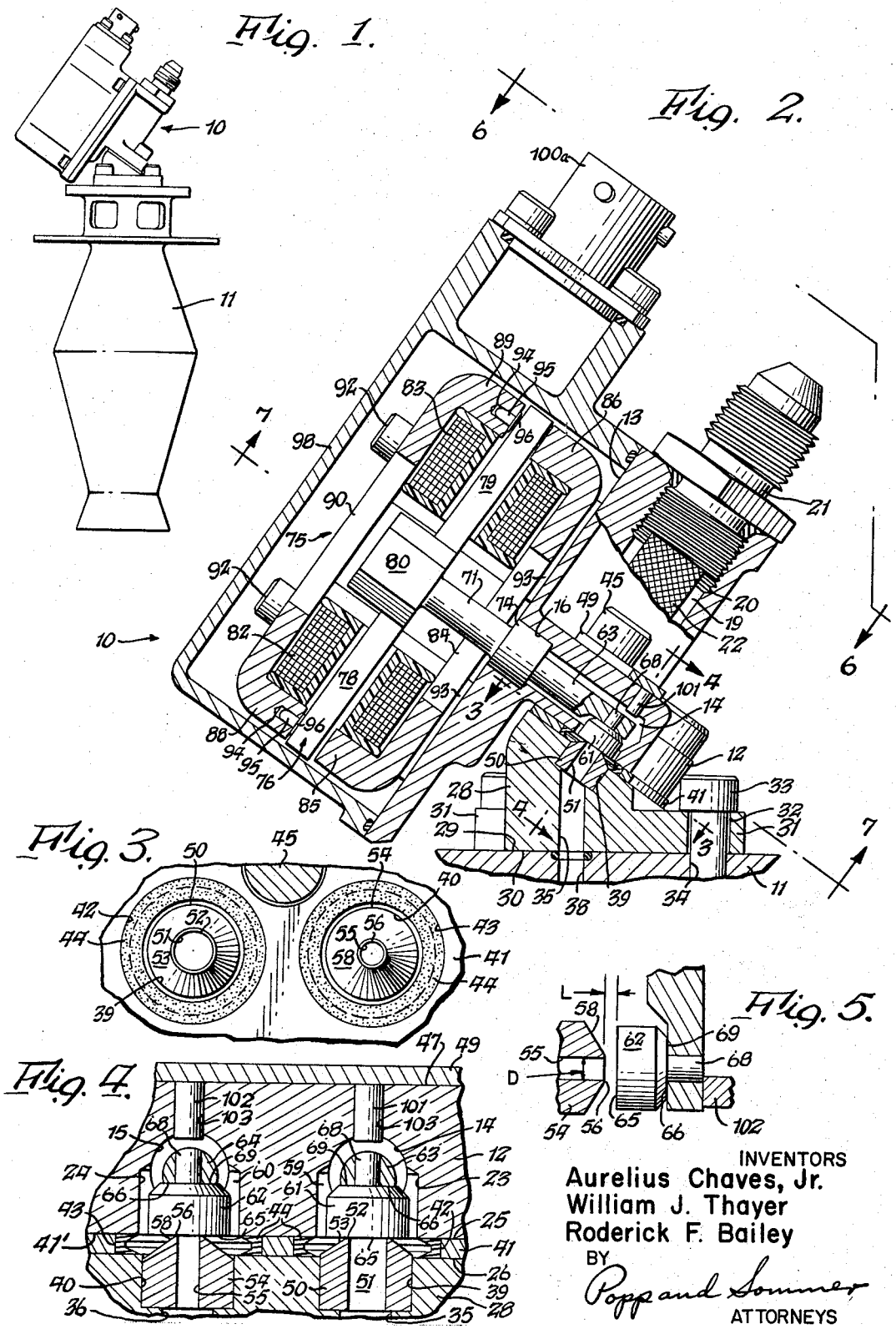

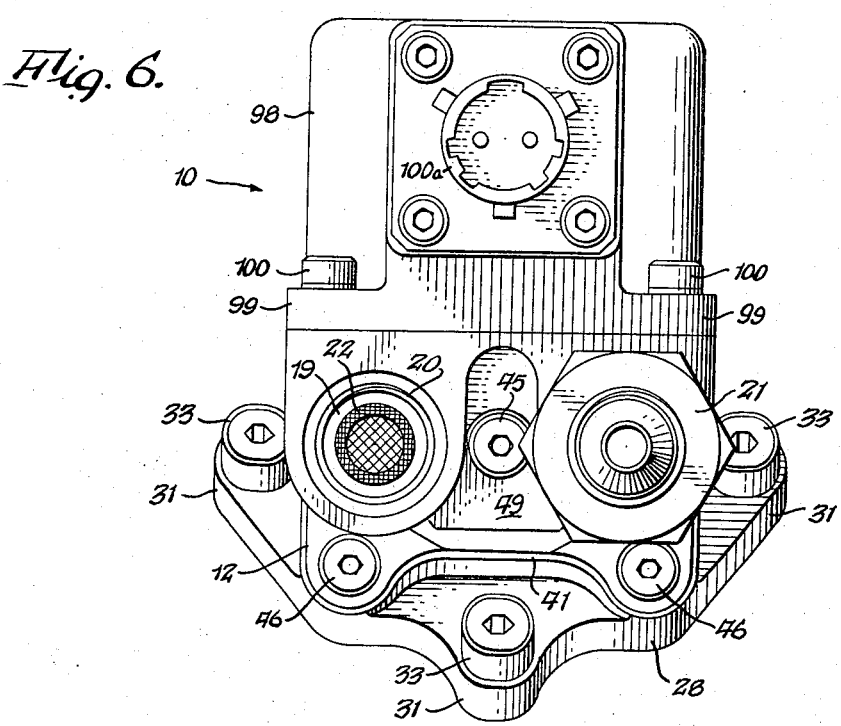
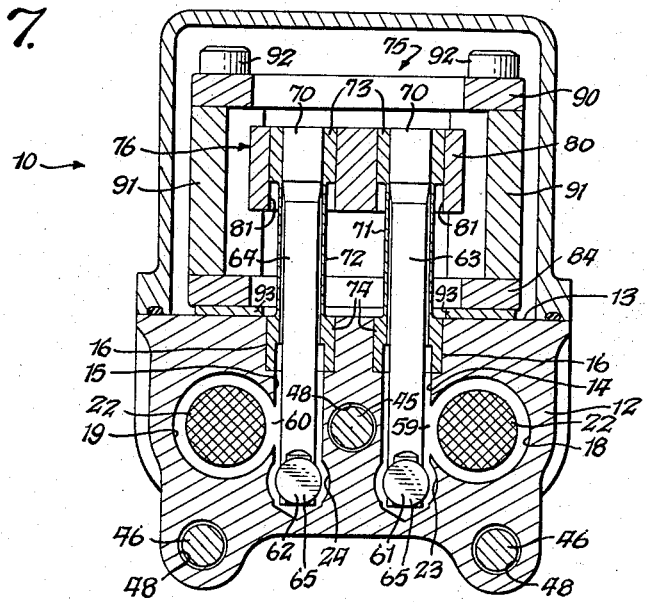

3,373,769
VALVE FOR CONTROLLING SIMULTANEOUSLY THE FLOW OF TWO SEPARATE FLUIDS
Aurelius Chaves, Jr., Lancaster, William J. Thayer, East Aurora, and Roderick F. Bailey, Alden, N.Y., assignors to Moog Inc., a corporation of New York
Continuation of application Ser. No. 387,637, Aug. 5, 1964. This application Nov. 2, 1966, Ser. No. 591,646
10 Claims. (Cl. 137—595)

ABSTRACT OF THE DISCLOSURE

A control valve for handling isolated fluids, comprising a body having separate chambers each with an inlet and an outlet, separate valve closure elements arranged severally in said chambers and connected together for movement in unison to open and close said outlets simultaneously in response to a command signal, and flexure means mounting each of said closure elements for such movement and also sealing said chambers one from another.

This application is a continuation of application Ser. No. 387,637, filed Aug. 5, 1964 and now abandoned.

This invention relates to a valve for controlling simultaneously the flow of two separate fluids.

While the inventive control valve has general adaptability to any suitable application, it has been found particularly useful to provide simultaneous on-off control of the bipropellants used in pulse-type hypergolic rocket engines.

An object of the present invention is to provide a control valve which has an extremely fast dynamic response to a command input.

Another object is to provide such a control valve where electrically operated which requires a low electrical control power.

Another object is to provide such an electrically operated control valve wherein the electrical parts are isolated from contact with the fluids being handled which otherwise might have a corrosive effect upon such parts.

A further object is to provide such a control valve which has no sliding parts in order to avoid sticking in the case where corrosive fluids are being handled by the valve.

A further object is to provide such a control valve which has a long term exposure capability.

A further object is to provide such a control valve which has an inherent fail safe close-off.

A still further object is to provide such a control valve which has a compact and rugged construction.

Other objects and advantages of the present invention will be apparent from the following detailed description of a preferred embodiment illustrated in the accompanying drawings in which:

FIG. 1 is a side elevational view of a control valve embodying the present invention and showing the same mounted on a hypergolic rocket engine.

FIG. 2 is an enlarged generally central longitudinal vertical sectional view of the control valve shown in FIG. 1.

FIG. 3 is an enlarged fragmentary transverse sectional view thereof taken on line 3—3 of FIG. 2.

FIG. 4 is an enlarged fragmentary longitudinal sectional view thereof taken generally on line 4—4 of FIG. 2.

FIG. 5 is an enlarged fragmentary sectional view similar to FIG. 2 and showing the relation of one of the valve closures to its seat when in an open condition.

FIG. 6 is an end elevational view of the control valve and is taken generally on line 6—6 of FIG. 2.

FIG. 7 is a transverse sectional view thereof taken generally on line 7—7 of FIG. 2.

Referring to FIG. 1, the inventive control valve represented generally by the numeral 10 is shown as mounted on the injection head of a pulse-type hypergolic rocket engine 11 such as one which might be used for attitude control in a missile or space vehicle. The purpose of control valve 10 is to provide simultaneous on-off control of the bipropellants such as fuel and oxidizer used in the engine. Generally storable fluid propellants are used. Examples of fuel include 50/50 unsymmetrical dimethyhydrazine, hydrazine and monomethyhydrazine, and examples of oxidizer include nitrogen tetroxide and fuming nitric acid. Other high performance propellants may be used.

Control valve 10 is shown as including a body 12 having a flat surface 13 and a pair of transversely spaced cylindrical recesses 14 and 15 which open to this surface. The axes of these recesses are shown as parallel to each other and perpendicular to flat surface 13. The mouth of each recess 14 and 15 is shown as enlarged as indicated at 16 for a puropose explained hereinafter.

Intermediate their ends the recesses 14 and 15 are intercepted severally by the corresponding ends of lateral cylindrical inlet passages 18 and 19, respectively, formed in the body 12. The outer end portion of each of these inlet passages is internally threaded as indicated at 20 to receive a fitting 21. These fittings are of any suitable construction and adapted to connect severally with fuel and oxidizer supply conduits (not shown). Arranged in each of inlet passages 18 and 19 is a filter element 22 of any suitable construction for filtering the fluid forced to flow therethrough before entering the corresponding recess 14 or 15.

Adjacent their inner ends the recesses 14 and 15 communicate with lateral cylindrical passages 23 and 24, respectively, of slightly larger diameter than these recesses. Passages 23 and 24 open to a second flat face 25 on body 12 which is shown as substantially perpendicular to surface 13.

Opposing flat face 25 is a flat face 26 on an adapter 28 which is shown as having a second and horizontal flat face 29 engaging the upper horizontal flat face 30 of the injection head of rocket engine 11. The base of adapter 28 is formed with integral laterally extending attaching ears or flanges 31, three being shown in FIG. 6. Each ear 31 has a vertical hole 32 through which the shank of an attaching screw 33 extends. The head of each screw 33 bears against the exposed upper surface of the corresponding ear and the threaded lower end of the screw shank is screwed into an aligned internally threaded recess 34 provided in the rocket engine injection head.

Adapter 28 is further shown as formed with a pair of vertical outlet passages 35 and 36 which at their lower ends severally communicate with conduit passages in the rocket engine, one of which is indicated at 38 in FIG. 2. At their upper ends passages 35 and 36 are shown as having angularly disposed cylindrical enlargements 39 and 40, respectively, which open to flat surface 26 and have their axes disposed substantially perpendicularly thereto. Referring to FIG. 4, the enlarged end 39 of outlet passage 35 is substantially coaxial with body passage 23, and the enlarged end 40 of outlet passage 36 is substantially coaxial with the other body passage 24.

Body 12 and its mounting adapter 28 have their respective flat faces 25 and 26 maintained apart and parallel by a spacer plate 41 which has two enlarged cylindrical holes 42 and 43 therethrough. Hole 42 is generally coaxial with passages 23 and 39, and hole 43 is generally aligned with passages 24 and 40. A seal ring 44 of any suitable construction is shown arranged in each of holes 42 and 43. Spacer plate 41 is clamped between faces 25 and 26 by a plurality of fastening screws, including a central screw 45 arranged between the spaced lateral projections of body 12 which house the two filters 22, and also including a pair of outer screws 46, as best shown in FIGS. 6 and 7. The shank of these screws extend severally through holes 48 provided in body 12 and are screwed into suitable internally threaded recesses (not shown) provided in adapter 28. Under the head of central screw 45 is a plate 49 for a purpose explained later herein.

A tubular seat member 50 is press-fitted into adapter passage enlargement 39 and is shown as having an aperture 51 extending therethrough which at its downstream end communicates with adapter passage 35 and at its upstream end is surrounded by a radially narrow annular seat 52 formed by the taper 53 on the end of the member. A similar tubular seat member 54 is press-fitted into adapter passage enlargement 40 and has a hole 55 therethrough which at its downstream end communicates with adapter passage 36 and at its upstream end is surrounded by a radially narrow annular seat 56 formed by the taper 58 on the end of the member. The annular seats 52 and 56 are shown as being substantially coplanar with each other and with flat face 25 on body 12.

Recess 14 with its associated lateral passages 18 and 23 provide a chamber 59 for which the entrance to aperture 51 provides an outlet and for which the entrance to or outer end of passage 18 provides an inlet. In a similar manner, recess 15 and its associated lateral passages 19 and 24 provide a chamber 60 for which the entrance to aperture 55 is an outlet and for which the entrance to or outer end of passage 19 provides an inlet.

Means are provided for simultaneously opening and closing such outlets without affecting such inlets and these means will now be described. Positioned opposite and normally engaging annular seat 52 in chamber 59 is a valve closure 61. A similar valve closure 62 is positioned opposite and normally engages annular seat 56. Each of the closures 61 and 62 is shown as mounted on the lower end of a flapper, designated 63 for closure 61 and 64 for closure 62.

Each of the closures 61 and 62 is shown as being in the form of a cylindrical button having a flat axially facing outer surface 65 and a similar flat inner surface 66 from which a cylindrical stem 68 projects centrally and axially. The lower end of each flapper 63 and 64 is shown as provided with an offset flat surface 69 which opposes and is engaged by flat surface 66 of the corresponding button.

Referring to FIG. 7, the upper end of each of the flappers 63 and 64 is shown as provided with a cylindrical enlargement 70. These portions 70 severally plug the upper ends of a pair of flexure tubes 71 and 72, the upper ends of these flexure tubes being reinforced for this purpose by external integral cylindrical enlargements or collars indicated at 73. Flexure tube 71 is shown as surrounding flapper 63, and flexure tube 72 as surrounding flapper 64. The lower end portions of these flapper tubes 71 and 72 are severally shown as externally and integrally enlarged annularly as indicated at 74 and these enlarged lower end portions in turn are severally press-fitted into the body recesses 16. In this manner the flexure tubes 71 and 72 are sealingly mounted on body 12 so as to communicate internally only with the corresponding one of the chambers 59 and 60, and are also sealingly connected to their respective flappers 63 and 64. The flexure tubes 71 and 72 by reason of their intermediate thin-walled sections can be bent or flexed to allow frictionless pivotal movement of the flappers relative to body 12 and thereby movement of the valve closures 61 and 62 relative to their respective seats 52 and 56.

Thus the control valve has two body sections, one comprising body 12 having its flat surface 25, and the other comprising adapter 28 and spacer plate 41 with the latter having a flat surface 41' opposing and contacting flat surface 25 when the body sections are joined together as shown in FIG. 4. But these body sections are separably joined along a common plane with which contacting surfaces 25 and 41' are coplanar. Seat elements 50 and 54 are fixed to body section 28, 41 and have their flat seats 52 and 56 severally coplanar with flat surface 41'. Closure elements 61 and 62 are flexure mounted on body section 12 and have their flat surfaces 65 severally coplanar with flat surface 25.

While any suitable means may be provided for moving the flappers in unison, such means are shown as comprising an electrical force motor such as a torque motor represented generally by the numeral 75. This motor 75 is shown as including an armature 76 having two arms 78 and 79 extending laterally and in mutual alignment from a central upstanding portion 80 provided with a pair of transversely spaced cylindrical holes 81 which sealingly receive severally the cylindrical enlargements 73 on the upper ends of flexure tubes 71 and 72.

The motor 75 is also shown as including a pair of electromagnetic coils 82 and 83 surrounding the armature arms 78 and 79, respectively. These coils 82 and 83 are shown as arranged between a lower pole piece 84 having upturned ends 85 and 86 which oppose and are spaced from the downturned ends 88 and 89 of an upper pole piece 90. Also arranged between the pole pieces 84 and 90 is a pair of permanent magnets 91, 91. The assembly comprising the pole pieces 84 and 90, the permanent magnets 91 and the coils 82 and 83 is fastened to body 12 by a plurality of fastening screws 92 in a well known manner. Two such fastening screws 92 are shown on opposite sides of each of the coils 82 and 83. Shims 93 are inserted between the lower pole piece 84 and the upper body flat surface 13 so as to dispose this described motor assembly in the desired position relative to the body. More will be said on this later herein.

It will be noted that the outer end portion of each armature member 78 and 79 extends into an air gap provided between the opposing pairs of pole piece ends such as 85, 88 and 86, 89. So as to prevent the armature 76 from contacting either of the pole pieces, the downturned ends 88 and 89 of upper pole piece 90 are severally shown as provided with a recess 94 receiving, as by a press fit, the shank 95 of a button 96 of non-magnetic material.

The motor 75 is encased by a removable cover 98 having a rim which sealingly engages flat surface 13 of body 12. Attaching flanges 99 are formed integrally at the corners of the cover and each such flange is provided with a hole through which a fastening screw 100 extends the threaded shank of which is screwed into an internally threaded recess (not shown) provided in body 12. The lead wires (not shown) for the electromagnetic coils 82 and 83 terminate in an electrical connector or receptacle 100$^a$ removably attached to cover 98. Preferably coils 82 and 83 are connected in parallel to give redundant protection against coil failure.

In the embodiment illustrated fluid oxidizer under pressure is admitted to chamber 59 and fluid fuel under pressure is admitted to chamber 60.

It will be noted that the oxidizer to fuel ratio can be controlled by controlling the effective outlet orifice size for each chamber. In the embodiment shown, the diameter of the aperture or through bore 55 of the fuel seat member 54 is smaller than the diameter of the corresponding aperture or through bore 51 of the oxidizer seat member 50. This diameter coupled with the axial spacing between the annular seat and the opposing operative face of the corresponding valve closure or button determines the effective size of the peripheral opening or outlet orifice for the corresponding chamber. This is best illustrated in FIG. 5 for the fuel chamber where D represents the diameter of aperture 55 and L represents the axial distance or spacing between seat 56 and closure face 65. The effective orifice area is therefore $\pi DL$.

The lift or displacement L of each valve closure is preferably desired to be the same so that the pressure drop created across the corresponding orifice will be the same, although some slight difference in the amount of lift of the two valves can be tolerated. The respective lift or displacement of each valve closure is controlled by engagement of the flapper with a stop pin. Referring to FIG. 4, such a stop pin 101 is shown associated with flapper 63 and another such stop pin 102 is associated with flapper 64. Each of these stop pins 101 and 102 is adjustably press-fitted into a lateral hole 103 opposite each flapper which extends between either recess 14 or 15 and the face 47 of body 12.

When adjusting the extent of pivotal movement desired for each of the flappers 63 and 64, the plate 49 is removed, this being accomplished by removing central fastening screw 45 and axially positioning stop pin 101 or 102 in its corresponding recess 103. When the proper adjustment has been effected, plate 49 and screw 45 are returned to position, the plate 49 serving to retain stop pins 101 and 102.

It will be seen that by not only adjusting the position of stop pins 101 and 102 but by substituting different seat members for the seat members 50 and 54 and having different aperture diameters, the desired oxidizer to fuel ratio can be provided.

It is a feature of the present invention that the fuel and oxidizer materials are kept separate from each other and from contact with the electrical torque motor 75. Separation is achieved by providing the separate chambers 59 and 60, and isolation is achieved by the provision of the flexure tubes 71 and 72. These flexure tubes not only permit frictionless pivotal movement of flappers 63 and 64 but also isolate fluid in chambers 59 and 60, respectively, from the motor 75. This is particularly important inasmuch as some propellants have a highly corrosive action and would deteriorate the electrical parts if contact were allowed. This dry-motor feature contributes to the long life and long term storage capabilities of the control valve.

It will also be noted that the armature 76 is supported by flexure tubes 71 and 72 and will move flappers 63 and 64 in unison, thereby achieving substantially concurrent opening or closing of the valve.

It is a feature of the invention noteworthy of special mention that the closure buttons 61 and 62 are biased to their normally closed conditions. That is, the closure buttons 61 and 62 press against their respective seats 52 and 56 when the torque motor 75 is de-energized. This is achieved by cocking the torque motor 75 relative to its armature 76 and specifically by interposing shims 93 of different thickness on opposite sides of the flexure tubes as viewed in FIG. 2. As shown, the shims 93 to the left of the flexure tubes are collectively thinner than those on the right hand side of these tubes. This causes the left end 88 of upper pole piece to be closer to the upper surface of the left armature arm 78. In fact, the non-magnetic stop button 99 is preferably engaged by the left armature arm 78. This prevents direct contact of the armature with a pole piece which if allowed to occur would render it difficult to separate these parts. Thus the cocking or tilting of the armature causes a flexing of the tube 71 and 72 so as to urge the flappers with their closure buttons 61 and 62 against their respective seats 52 and 56, even when the electromagnetic coils 82 and 83 are de-energized which they normally are.

However, when the coils 82 and 83 are energized by a suitable electrical signal input, they will cause the armature 76 to pivot in a counterclockwise direction as viewed in FIG. 2 about an intermediate imaginary fulcrum arranged intermediate the longitudinal extent of the thin-walled portions of these flexure tubes. This will cause the closure buttons to be lifted off their respective seats. As previously noted the extent to which the closure buttons lift off their seats is determined by the stop pins 101 and 102. When the valve is open as depicted in FIG. 5 it will be seen that fluid whether it be fuel or oxidizer will flow through the peripheral opening or outlet orifice existing between the opposing surfaces such as 56 and 65, then flow into the downstream aperture such as 55 and further flow downstream into the connecting passages and into the rocket engine 11.

Such energization of the electromagnetic coils 82 and 83 will cause the right armature arm 79 as viewed in FIG. 2 to engage the non-magnetic stop button 96 carried by right end 89 of upper pole piece 90, thereby again preventing direct contact between the armature and any of the pole pieces. This energization of the coils and constant movement of the armature will cause a partial relief of the initial biasing bend of these tubes but such relief will not be complete. This is so that when the energized current is removed, the residual force exerted by the flexed tubes 71 and 72 will restore forcefully and smartly the closure buttons 61 and 62 to a closed position against their respective seats 52 and 56.

Having the flappers 63 and 64 loaded against either the seats 52 and 56 or against the stop pins 101 and 102 eliminates transient movements of these flappers due to acceleration or vibration of the structure supporting the control valve. Thus the control valve provides bang-bang control in response to electrical signals which are either on or off.

Inasmuch as modifications and changes may occur to those skilled in the art without departing from the spirit of the present invention, the embodiment shown is illustrative and not limitative of the invention the scope of which is to be measured by the appended claims.

What is claimed is:

1. A valve for controlling simultaneously the flow of two separate fluids, comprising a body having separate chambers each having an inlet and an outlet, flapper means for each of said chambers and arranged therein to open and close the corresponding one of said outlets without affecting the corresponding one of said inlets, a flexure tube for each of said flapper means and surrounding and pivotally supporting the same, each of said tubes at one end being sealingly mounted on said body so as to communicate interiorly only with the corresponding one of said chambers and at its other end being sealingly connected to the corresponding one of said flapper means, means so pivoting both said flapper means in unison to open or close said outlets simultaneously in response to a command signal, means supplying one of said fluids to one of said inlets, and means supplying the other of said fluids to the other of said inlets.

2. A valve according to claim 1 wherein said pivoting means comprises a torque motor including a movable armature rigidly connected to both said flapper means.

3. An electrically operated valve for controlling simultaneously the flow of two separate fluids, comprising a body having separate chambers each having an inlet and an outlet, a seat surrounding each of said outlets adjacent the corresponding one of said chambers, flapper means arranged in each of said chambers and engaging the corresponding one of said seats so as to be in a closed condition but movable away from such seat to an open condition without affecting the corresponding one of said inlets, a flexure tube for each of said flapper means and surrounding and pivotally supporting the same, each of said tubes at one end being sealingly mounted on said body so as to communicate interiorly only with the corresponding one of said chambers and at its other end being sealingly connected to the corresponding one of said flapper means, a torque motor including a movable armature rigidly connected to both said flapper means to so pivot the same in unison from said closed condition to said open condition whereby said outlets are opened simultaneously, stop means engaged by said flapper means to limit the extent to which they open, means supplying one of said fluids to one of said inlets, and means supplying the other of said fluids to the other of said inlets.

4. An electrically operated valve for controlling simultaneously the flow of two separate fluids, comprising a body having a surface and spaced recesses opening to said surface, the ends of said recesses adjacent said surface being enlarged, means providing an inlet and an outlet for each of said recesses, flapper means for each of said recesses and arranged partially therein to open and close the corresponding one of said outlets without affecting the corresponding one of said inlets, a flexure tube for each of said flapper means and surrounding and pivotally supporting the same, one end of each of said tubes being sealingly arranged in the enlarged portion of the corresponding one of said recesses, the other end of each of said tubes being sealingly plugged by the end of the corresponding one of said flapper means, torque motor means mounted on said body and including a movable rigid armature and electromagnetic means operatively associated with said armature, said armature having holes severally plugged by said other ends of said tubes, whereby movement of said armature moves both said flapper means in unison to open and close said outlets simultaneously, means supplying one of said fluids to one of said inlets, and means supplying the other of said fluids to the other of said inlets.

5. An electrically operated valve for controlling simultaneously the flow of two separate fluids, comprising a body having a surface and spaced recesses opening to said surface, the ends of said recesses adjacent said surface being enlarged, means providing an inlet and an outlet for each of said recesses, a seat surrounding each of said outlets adjacent the corresponding one of said recesses, flapper means for each of said recesses and arranged partially therein and engaging the corresponding one of said seats so as to be in a closed condition but movable away from such seat to an open condition without affecting the corresponding one of said inlets, a flexure tube for each of said flapper means and surrounding the same, one end of each of said tubes being sealingly arranged in the enlarged portion of the corresponding one of said recesses, the other end of each of said tubes being sealingly plugged by the end of the corresponding one of said flapper means, torque motor means including spaced pole pieces providing air gaps, a rigid armature movably arranged in said air gaps, permanent magnet means arranged between said pole pieces and electromagnetic coil means surrounding said armature, said armature extending transversely of both said flapper means and tubes and having holes in its central portion severally plugged by said tubes, means mounting said torque motor means on said body so as to cause said permanent magnet means to magnetically bias both said flapper means against said seats when no electrical signal is present, said outlets being opened simultaneously when said electromagnetic coil means are energized to cause said armature to move both said flapper means in unison to said open condition, means supplying one of said fluids to one of said inlets, and means supplying the other of said fluids to the other of said inlets.

6. An electrically operated valve according to claim 5 wherein stop means are provided on the side of said flapper means opposite from said seats and spaced from said flapper means when in said closed condition but against which said flapper means are biased when in said open condition due to energization of said electromagnetic coil means.

7. A valve for controlling simultaneously the flow of two separate fluids, comprising a body having separate chambers each having an inlet and an outlet, separate valve means for said outlets arranged severally in said chambers and operative to open and close said outlets without affecting said inlets, each of said valve means including a fixed seat element and a movable closure element, flexure means mounting each of said closure elements on said body for frictionless movement relative thereto, said flexure means being the sole support for said closure elements and the same means also sealing said chambers one from another, movable means rigidly connecting said closure elements together for effecting their said movement in unison to open or close said outlet simultaneously, means for moving said connecting means in response to a command signal.

8. A valve according to claim 7 wherein said flexure means comprise a flexure tube for each of said closure elements.

9. A valve according to claim 8 wherein said means for moving said connecting means comprises a torque motor including spaced pole pieces with which permanent magnet and electromagnetic means are operatively associated and an armature arm movably arranged in the space between said pole pieces, said armature arm being rigidly connected to said connecting means and thereby supported on said flexure tubes, and further means are provided for cocking said pole pieces relative to said body such that said armature arm is closer to one of said pole pieces than the other when said electromagnetic means are de-energized whereby said flexure tubes are flexed and said movable closure elements are biased against said seat elements.

10. A valve according to claim 7 wherein said body includes two sections each having a flat surface, said seat elements being fixed to one of said body sections and having flat seats severally coplanar with its said flat surface, said movable closure elements being flexure mounted on the other of said body sections and having flat faces severally coplanar with its said flat surface, and said body sections being separably joined along a common plane with which said flat surfaces are coplanar.

References Cited
UNITED STATES PATENTS

| | | | |
|---|---|---|---|
| 2,380,827 | 7/1945 | Downs | 137—595 X |
| 2,708,561 | 5/1955 | Ehlke | 251—129 |
| 2,790,427 | 4/1957 | Carson | 137—625.61 |
| 2,803,266 | 8/1957 | Towler et al. | 251—129 X |
| 3,017,864 | 1/1962 | Atchley | 91—3 |
| 3,026,082 | 3/1962 | Essig | 251—335 X |
| 3,100,963 | 8/1963 | Michel | 60—240 |
| 3,115,895 | 12/1963 | Fister et al. | 137—595 |
| 3,117,585 | 1/1964 | Gerwig et al. | 137—625.61 |
| 2,625,136 | 1/1953 | Moog | 251—129 X |

HENRY T. KLINKTIEK, *Primary Examiner,*

UNITED STATES PATENT OFFICE
CERTIFICATE OF CORRECTION

Patent No. 3,373,769                                              March 19, 1968

Aurelius Chaves, Jr., et al.

It is certified that error appears in the above identified patent and that said Letters Patent are hereby corrected as shown below:

Column 3, line 6, "shank" should read -- shanks --. Column 8, line 20, before the period insert -- , means supplying one of said fluids to one of said inlets, and means supplying the other of said fluids to the other of said inlets --.

Signed and sealed this 30th day of September 1969.

(SEAL)
Attest:

Edward M. Fletcher, Jr.                                 WILLIAM E. SCHUYLER, JR.

Attesting Officer                                               Commissioner of Patents